United States Patent [19]
Gaffney

[11] Patent Number: 5,819,477
[45] Date of Patent: Oct. 13, 1998

[54] APPARATUS AND METHODS FOR SECURING A BUILDING

[75] Inventor: George Gaffney, Brick, N.J.

[73] Assignee: Hurricane Straps Inc., Brick, N.J.

[21] Appl. No.: 714,589

[22] Filed: Sep. 16, 1996

[51] Int. Cl.⁶ .................................................. E04D 13/00
[52] U.S. Cl. ................................ 52/23; 52/155; 52/157; 52/163; 52/4; 135/115; 135/119
[58] Field of Search ............................. 52/23, 155, 157, 52/163, DIG. 11, 3, 4, DIG. 12, DIG. 14; 135/115, 119, 95, 96, 128, 134, 150, 120.3, 120.4

[56] References Cited

U.S. PATENT DOCUMENTS

| | | |
|---|---|---|
| 777,441 | 12/1904 | Small . |
| 3,054,151 | 9/1962 | Shankland . |
| 3,162,920 | 12/1964 | Durham . |
| 3,225,408 | 12/1965 | Durham . |
| 3,416,762 | 12/1968 | Headrick . |
| 3,449,874 | 6/1969 | Beaupre . |
| 3,726,054 | 4/1973 | Anderson et al. . |
| 3,848,367 | 11/1974 | Bames . |
| 3,871,142 | 3/1975 | Abbott . |
| 3,894,365 | 7/1975 | Abbott . |
| 3,914,910 | 10/1975 | Struben . |
| 3,927,494 | 12/1975 | Struben . |
| 3,943,670 | 3/1976 | Miller . |
| 4,364,205 | 12/1982 | Scott . |
| 5,319,896 | 6/1994 | Winger . |
| 5,388,378 | 2/1995 | Frye . |
| 5,522,184 | 6/1996 | Oviedo-Reyes ............................ 52/3 X |
| 5,537,786 | 7/1996 | Lozier et al. ................................ 52/23 |
| 5,570,545 | 11/1996 | Adams ........................................ 52/23 |
| 5,579,794 | 12/1996 | Sporta ..................................... 52/23 X |
| 5,608,992 | 3/1997 | Floyd ..................................... 52/23 X |
| 5,623,788 | 4/1997 | Bimberg et al. ............................ 52/23 |

Primary Examiner—Creighton Smith
Assistant Examiner—W. Glenn Edwards

[57] ABSTRACT

The apparatus can secure a building having a roof, with a plurality of lines and a plurality of ground anchors, which are planted around the building peripherally. The lines are adapted to be attached to the ground anchors and routed over the building. Netting material spans the lines at the roof. The apparatus may also have at least one cinch transversely spanning the lines at the roof of the building. At least one lashing may be directed transversely to the predetermined azimuthal direction and may be connected between one of the lines and one of the anchors. A plurality of tubular boots may separately encircle corresponding ones of the anchors for providing peripheral clearance around the anchors.

15 Claims, 3 Drawing Sheets

APPARATUS AND METHODS FOR SECURING A BUILDING

BACKGROUND OF THE INVENTION

1. Field of the Invention

The present invention relates to apparatus and methods for securing a building, and in particular, to lines that are routed over a building and secured to anchors on opposite sides of the building.

2. Description of Related Art

Business and home owners that are located in areas that are subject to hurricanes or tornadoes, have a need to provide temporary reinforcement to their structures in order to reduce the amount of damage done by wind, rain and pressure differentials that occur during a hurricane or tornado.

Straps can be used to secure a structure and reduce the amount of damage done by such hurricanes or tornadoes. Such systems can use a system of straps that are connected to permanently installed anchors and provide protection for the roof and additional anchoring support to the structure to resist the wind and atmospheric pressure forces that a hurricane or tornado can produce.

In U.S. Pat. No. 3,054,151 straps are routed over the top of a house trailer and secured to recessed anchors that are imbedded in concrete blocks. This reference leaves large areas between the straps exposed to damaging atmospheric forces. This arrangement also applies high point pressure at corners of the structure.

U.S. Pat. No. 3,848,367 shows a plastic strap with reinforcing steel bands. The straps are routed over the top of a mobile home or the like. The anchor is an auger disc connected to a yoke bearing a shaft that is used to wind and tighten the strap. Again, this reference applies high point pressure and leaves large areas between the straps unprotected.

Polyester fiber straps in U.S. Pat. Nos. 3,871,142 and 3,894,365 are routed over the top and vertically down the sides of a mobile home. The straps are tightened by a ratcheting winch that is connected to an anchor shaft having an auger disc at its lower end. Again, this reference applies high point pressure and leaves large areas between the straps unprotected. See also U.S. Pat. Nos. 3,914,910 and 3,927,494.

U.S. Pat. No. 3,726,054 shows a cable routed around brackets that are secured to the corners of a temporary or portable building. The cable is routed across the top of the building between two of the corner brackets. The cable is also routed vertically down the sides of the building to attach to corkscrew anchors that can be screwed into the ground. The cable appears to be tightened by means of a turnbuckle. Again, this reference leaves large areas between the straps unprotected.

U.S. Pat. No. 777,441 shows cables that are routed over a block mounted at the peak of a roof and through holes in the eaves. These eave holes have a reinforcing plate mounted around them. The cables extend vertically downward along the side of the house and are secured to anchors buried underground. The cables can be tightened with turnbuckles. This reference requires modification of the house and also leaves large areas between the straps unprotected.

U.S. Pat. No. 3,943,670 shows rods connecting to brackets at the corner of a structure. The rods are shown extending across the top of the structure and vertically down the side. The vertical rods are connected to an anchor having an auger at its lower end. This reference lacks a flexible line or strap. See also U.S. Pat. No. 3,449,874 for lines that attached to the sides of a house with being routed over the roof.

U.S. Pat. Nos. 3,162,920 and 3,225,408 show a flexible cover that can be tied down by strips that are secured to the edges of the cover. The strips have reinforced holes. See also U.S. Pat. Nos. 3,416,762 and 4,364,205.

See also U.S. Pat. Nos. 5,319,896, and 5,388,378.

Accordingly, there is need to provide an improved system for temporarily reinforcing a structure to reduce the damage done by the atmospheric forces, such as a hurricane or tornado.

SUMMARY OF INVENTION

In accordance with the illustrative embodiments demonstrating features and advantages of the present invention, there is provided apparatus for securing a building having a roof, with a plurality of lines and with a plurality of ground anchors planted around the building peripherally. The plurality of lines are adapted to be attached to the ground anchors and routed over the building. Also included is netting material spanning the lines at the roof.

According to a second aspect of the present invention apparatus can secure a building having a roof, with the plurality of ground anchors and the plurality of lines just mentioned. Without necessarily using netting material, the apparatus has at least one cinch transversely spanning the lines at the roof of the building.

According to a third aspect of the present invention apparatus can secure a building having a roof with the above plurality of ground anchors. The apparatus also includes a plurality of lines adapted to be attached to the ground anchors and routed over the building. These lines are directed in substantially the same predetermined azimuthal direction. Also included is at least one lashing directed transversely to the predetermined azimuthal direction and connected between one of the lines and one of the anchors.

Apparatus according to a fourth aspect of the invention can secure a building having a roof with a plurality of lines and a plurality of ground anchors planted around the building peripherally. The plurality of lines are adapted to be attached to the ground anchors and routed over the building. These lines are directed in substantially the same predetermined azimuthal direction. Also included is a plurality of tubular boots separately encircling corresponding ones of the anchors for providing peripheral clearance around the anchors.

According to a related method of the same invention a building having a roof can be secured with lines, ground anchors and netting material. The method includes the step of planting a plurality of ground anchors around the building peripherally. Another step is routing a plurality of lines over the building with netting material spanning the lines. The method also includes the step of attaching opposite ends of the lines to opposing ones of the ground anchors.

According to still another aspect of the invention another method can secure a building having a roof, by employing ground anchors, lines and at least one cinch. This method includes the step of planting a plurality of the ground anchors the building peripherally and routing a plurality of the lines over the building and attaching the lines to the ground anchors. The method also includes the step of spanning at least the one cinch transversely to the lines at the roof of the building.

Still another method according to a further aspect of the invention can secure a building having a roof by employing lines, at least one lashing, and netting material. The method includes the step of planting a plurality of ground anchors around the building peripherally and routing a plurality of lines over the building in substantially the same predetermined azimuthal direction. Another step is attaching opposite ends of the lines to opposing ones of the ground anchors. The method also includes the step of directing at least the one lashing transversely to the predetermined azimuthal direction and connecting the one lashing between one of the lines and one of the anchors.

Apparatus and methods according the foregoing can provide hurricane straps for temporary reinforcement required for a structure to help withstand the forces associated with a hurricane or tornado. Such hurricane straps may be a system of anchors, netting, straps and winches that provide the required reinforcement.

In a preferred embodiment, anchors are driven into the ground at predetermined distances, depending upon the size and configuration of the structure. The upper portion of the anchors may be housed in a recessed boot that is mounted at ground level to allow the anchors to be hidden when not being used.

Preferably, an interlocked, parallel series of straps are placed over the roof line with their attaching points in line with the anchors. Preferably, netting is connected between the straps to provide the support required to help prevent the shingles from being blown off the roof.

Brackets are preferred at the peak of the roof to distribute the forces on the strap over a wider area of the roof. The roof straps are connected to the anchors through preferred leader straps, employing quick connectors and a ratcheting winch. The straps are then tightened using the winch portion of the strap. The anchors provide the necessary support required to secure the structure.

BRIEF DESCRIPTION OF THE DRAWINGS

The above brief description as well as other objects, features and advantages of the present invention will be more fully appreciated by the reference to the following detailed description of presently preferred, but nonetheless illustrative embodiments in accordance with the present invention, when taken in conjunction with the accompanying drawings, wherein.

DETAILED DESCRIPTION OF THE PREFERRED EMBODIMENTS

Figure 1:
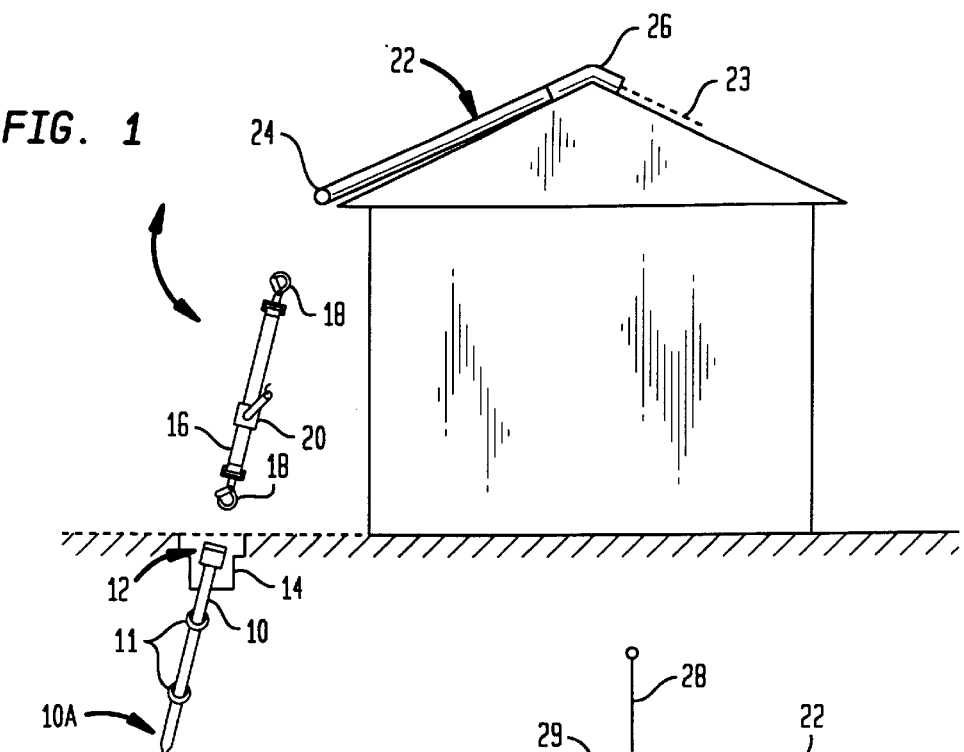
FIG. 1 is an elevational view of apparatus fitted to a building in accordance with the principles of the present invention.
Figure 2:
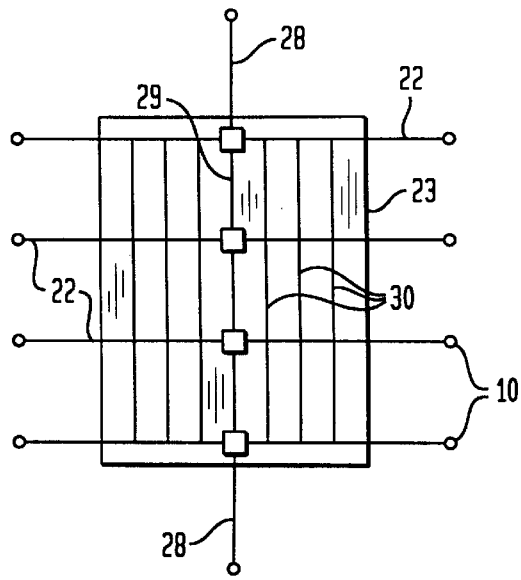
FIG. 2 is a plan view of the apparatus of FIG. 1.
Figure 3:
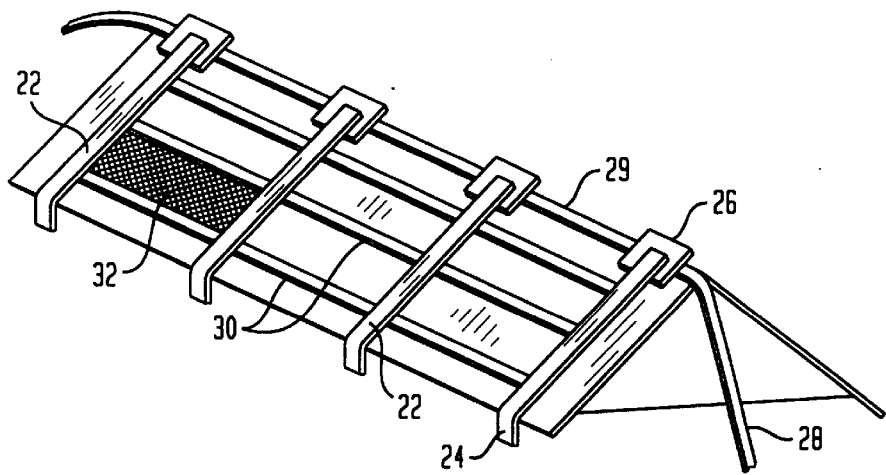
FIG. 3 is an axonometric view of the roof with the straps of FIG. 1.
Figure 4:
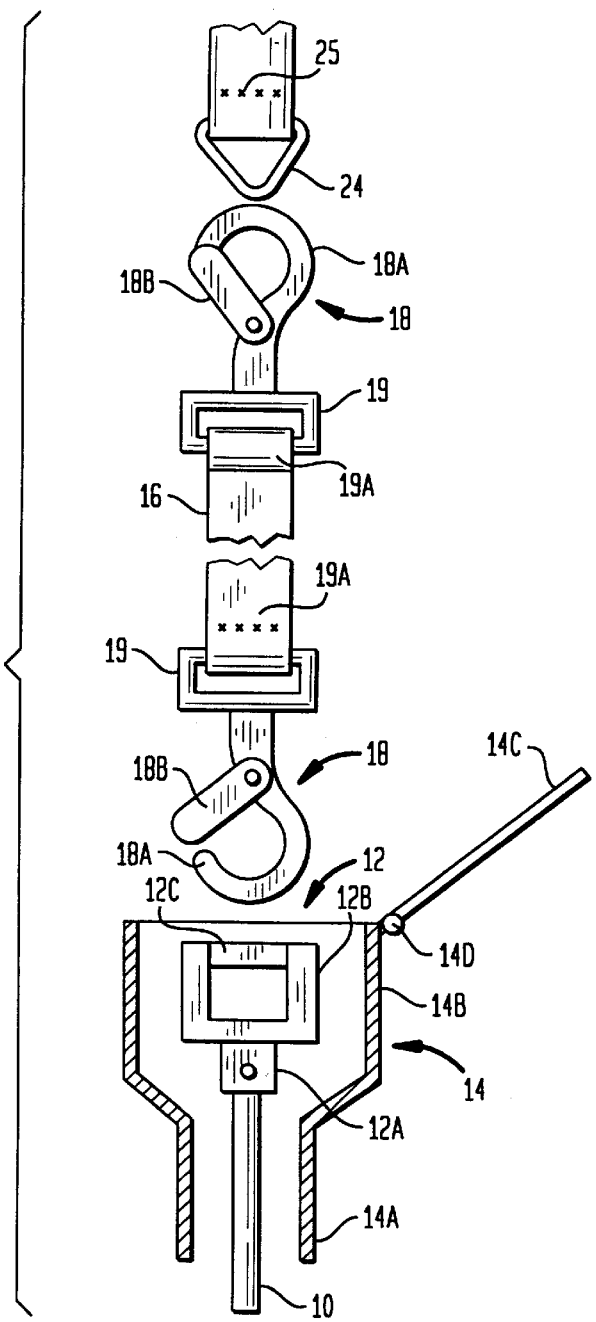
FIG. 4 is a detailed view of the line of FIG. 1 and its fastening hardware.
Figure 5:
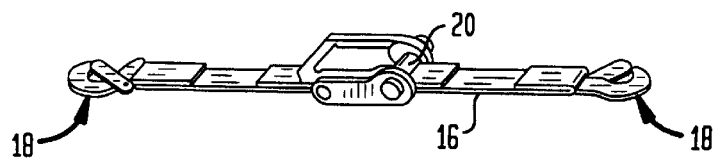
FIG. 5 is an axonometric view of the line and tensioning means of FIG. 4.
Figure 6:
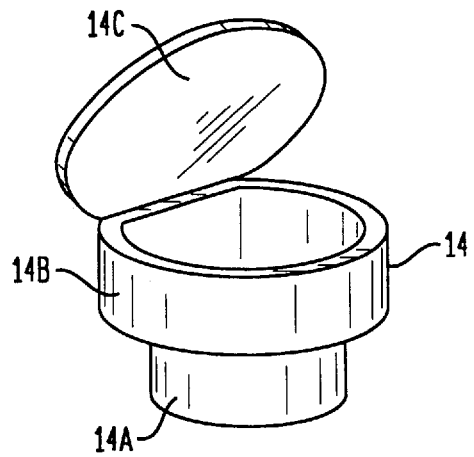
FIG. 6 is a detailed axonometric view of the boot of FIG. 4.
Figure 7:
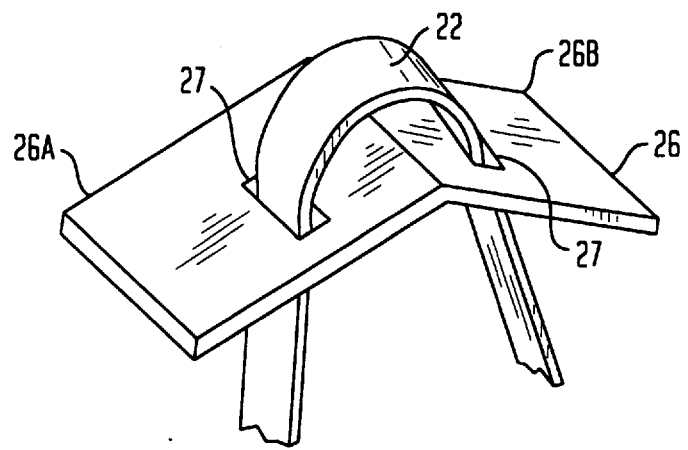
FIG. 7 is an axonometric view of the bracket of FIG. 1.

Referring to the apparatus of FIGS. 1 through 7, a ground anchor 10 is inserted into the ground at an acute angle to vertical using conventional power equipment. The ground anchor includes a steel shaft 10A at a suitable diameter, for example, 1½ to 2 inches (3.8 to 5.1 cm). It will be appreciated that the actual diameter will be chosen to accommodate the expected forces applied to the anchor. Two steel spiral blades 11 of approximately 12 inches in diameter are welded to shaft 10A. Depending upon the soil type, the anchors have either single or twin spiral blades (or a continuous, multi-turn auger blade) and are designed for heavy loading. Each spiral blade 11 acts essentially as a separate anchor for increased holding capacity. Extension shafts may be coupled to the shaft 10A for installation to the depth required to plant the blades 11 into firm anchoring soil. Such anchors are available from Vanyo Inc., Berlin, Pa.

In an alternate embodiment rock anchors can be used for holding in solid rock. Alternatively, expanding anchors can be used under other soil conditions.

Funnel-like boot 14, made of either plastic or steel, encircles shaft 10A. The top of boot 14 is flush with the ground and provides a clear recess to conceal and protect the top of anchor 10. The boot 14 has a hollow cylindrical shape with a top cylinder 14B having a diameter of, for example, six inches that is tapered down to a bottom cylinder 14A having a diameter of approximately 2 inches. This shape and size can be varied in other embodiments.

Lid 14C, hinged at a molded, live hinge point 14D, provides protection for the head of anchor 10. Instead of a hinge, lid 14C can be attached to the rim of upper cylinder 14B with a vertical pin and allowed to rotate azimuthally and permit access to the anchor head for the purpose of the tensioning straps to be described presently.

An eyenut 12 is attached to the end of the anchor 10. The eyenut 12 is made of steel and has a socket 12A that is attached to anchor 10. The top of the eyenut 12 is pinned, screwed or bolted atop anchor 10 and is positioned just below ground level. The eyenut has jaws pieces 12B that form a U shape, which is spanned by a cylindrical top piece 12C that can accommodate tensioning strap clamps.

The tensioning lines 16 are leaders made from straps or webbing terminated with snap hooks 18 at each end for connecting between the anchor eyenuts 12 and the main lines 22 located on the roof 23 of the building. The preferred snap hooks 18 are made of two pieces. Hook portion 18A is forged from steel into a rounded hook that is closed by a spring loaded snap 18B that prevents the hook portion from slipping off its connection. The top portion of the hook has a rectangular loop 19 for holding strap 16. The ends of the strap 16 are inserted through the loops 19 and folded back. Nylon thread may be used to stitch the strap and form loops 19A that hold onto the openings of the loops 19.

Each leader strap 16 has along its length a winch device 20 used as a tensioning means. The winch device 20 contains a take up roller that holds the excess webbing when the ratcheted handle on the winch is pulled. Such tensioning devices are available from Bairstow Distributing, Atlanta, Ga.

The main straps 22 are designed to suit the individual structure. Here four parallel straps are routed over the peak of roof 23. Straps 22 are made of high strength, fibrous webbing. When joined to leaders 16, straps 22 may be considered lines that extend in a predetermined azimuthal direction.

In this embodiment six cinches 30 are laid across the main straps 22 and are stitched or riveted at the intersections to form a checkerboard pattern over the entire roof 23. Cinches 30 may be made of the same material as straps 22.

Secured at each end 25 of the main straps 22 are rings 24 that connect to the snap hooks 18 of leaders 16. The strap 22 is inserted through the ring 24 opening and folded back onto itself. Nylon thread is used to stitch the strap and form a loop that encloses the ring.

The main straps 22 are routed through peak brackets 26 located at the peak of the roof 23. The brackets 26 are made of two integral wings 26A and 26B joined together at an angle matching the pitch of the roof 23. Bracket 26 may be made of a soft metal or compliant material, to prevent damage to the roof 23. Each wing 26A and 26B has a rectangular slot 27 that allows the strap 22 to pass under the distal ends of the wings 26A, 26B and over their pointed joint. Bracket 26 will distribute the force of the straps 22 across an area that is much wider than the actual strap.

Netting material 32 may be attached across straps 22 to aid in holding down of the roof 23 and its shingles. The netting material 32 is looped around and, optionally, sewn to the straps. The preferred netting is made of lightweight nylon or similar material to keep down the weight of the apparatus. Such netting material is available from Zapata Haynie Corporation, Reedville, Va.

To facilitate an understanding of the principles associated with the foregoing apparatus, its operation will be briefly described. The number of straps, distance between the straps and the size and rating of the straps will be selected to accommodate the needs of the individual building to provide the correct amount of tension to secure the structure and minimize the effect of the high winds found, for example, in hurricanes. Then, the type of anchor and its depth is determined in dependence upon the composition of the soil or other material surrounding the structure. The type of soil determines the type and number of anchors required to obtain the correct holding capability. This may require a soil probe to determine the type of soil.

The anchor 10 is installed at an angle that is slightly steeper than the pitch of the roof as shown in FIG. 1, to distribute the strap force over the entire roof 23, as opposed to placing all the force on the peak of the roof. The anchor 10 is typically installed using power driven equipment to screw or drive the anchor down.

The anchor 10 is started in a near vertical position. After the anchor has a good start, the drive angle of the power equipment is adjusted so that the anchor is planted at its proper position. The anchor is then driven to the required depth and the power equipment is removed. The top of the anchor is then below ground level to prevent the anchor from becoming a tripping hazard when the straps are not being used.

Soil around the upper end of anchor 10 is cleared to receive boot 14.

Boot 14 covers anchor 10 and its hinged lid 14C is located at ground level to make an even surface when the anchors are not in use. The top of anchor 10 is now fitted with an eyenut 12 to provide a hook and eye joint for the tensioning straps 16.

The main straps 22 are placed over the roof 23 with the roof brackets 26 positioned at the peak of the roof 23. The rings 24 at the end of the straps 22 are aligned with the anchors 10. The installer now attaches the snap hooks 18 at the ends of the tensioning straps 16 to the rings 24 to form a hook and eye joint. The hooks 18 on the opposite ends of the tensioning straps 16 are snapped onto the eyenuts 12 on the anchors 10. Then the hand winches 20 tighten the tensioning straps 16 one at a time until the pressure is equal on all the straps.

Additional lashings 28 can be added to give support to the ends of the building. Such lashings will connect to reinforcing lashing 29, which runs along the peak of the roof 23. Lashings 28 and 29 are secured by stitches or rivets at each intersection with main straps 22. The distal ends of lashings 28 are connected to ground anchors similar to anchors 10. Lashings 28 may also include tensioning means similar to those used in leaders 16.

It is appreciated that various modifications may be implemented with respect to the above described preferred embodiment. For example, additional anchors and straps can be around the structure to give extra support. The configuration of the apparatus can be customized to handle buildings with complex shapes such as wings, attached garages, enclosed and open porches, small dormers, etc. In an other embodiments, the straps can be permanently attached under the roof during initial construction or as a retrofit. In still other embodiments the straps may lay atop the roof shingles, but be covered to blend in with the roof and protect the straps. Leaving the roof straps in place would require only the installation of the tensioning straps to complete the reinforcement of the structure.

Obviously, many modifications and variations of the present invention are possible in light of the above teachings. It is therefore to be understood that within the scope of the appended claims, the invention may be practiced otherwise than as specifically described.

I claim:

1. Apparatus for securing a building having a roof, said roof having a peak, and said roof having a declining pitch from said peak, said apparatus comprising:

a plurality of ground anchors adapted to be planted around said building peripherally;

a plurality of tensioning lines having a first end and a second end, said first end of each of said plurality of tensioning lines attached to said ground anchors;

a plurality of peak brackets adapted to be placed atop the peak of said roof, said plurality of peak brackets each having a pair of angularly disposed wings, each of said pair of angularly disposed wings having a slotted aperture;

a plurality of fibrous webbing straps having a first end and a second end, said plurality of fibrous webbing straps each adapted to be routed over said building, said first end of each of said plurality of fibrous webbing straps attached to said second end of one of said plurality of tensioning lines, said second end of each of said plurality of fibrous webbing straps attached to said second end of one of said plurality of tensioning lines, said first end and said second end of each of said plurality of fibrous webbing straps adapted to be located on opposite sides of said building, said plurality of fibrous webbing straps separately received by individual ones of said plurality of peak brackets by threading each of said fibrous webbing straps through said slotted aperture of each of said pair of angularly disposed wings; and netting material spanning said fibrous webbing straps at said roof.

2. Apparatus according to claim 1 comprising at least one fibrous webbing cinch transversely spanning said fibrous webbing straps at the roof of said building.

3. Apparatus according to claim 2 wherein said fibrous webbing straps are directed in substantially the same predetermined azimuthal direction, said apparatus comprising at least one lashing directed transversely to the predetermined azimuthal direction and connected between one of said fibrous webbing straps and one of said anchors.

4. Apparatus according to claim 1 comprising a tensioning means incorporated within each of said plurality of tensioning lines for tensioning said fibrous webbing straps.

5. Apparatus according to claim 4 wherein each of said tensioning lines is coupled with said fibrous webbing straps via a hook and eye joint.

6. Apparatus according to claim 1 wherein each of said anchors are spaced from said building to dispose taut sections of said tensioning lines between the anchor and the building at an acute angle relative to horizontal.

7. Apparatus according to claim 1 wherein said anchors each comprise:
   a shaft; and
   a spiral blade helically disposed on said shaft.

8. Apparatus according to claim 1 wherein said anchors each comprise:
   a shaft; and
   a axially spaced plurality of spiral blades each helically disposed on said shaft to spiral about said shaft 360°.

9. Apparatus according to claim 1 wherein said anchors each comprise an auger.

10. Apparatus according to claim 1 wherein said anchors each comprise an expandable member for gripping a hole bored into a rock.

11. Apparatus according to claim 1 comprising a plurality of tubular boots separately encircling corresponding ones of said anchors for providing peripheral clearance around said anchors.

12. Apparatus according to claim 11 wherein said boots each have a rim and each comprise a lid hinged to the rim of said boot.

13. Apparatus according to claim 12 comprising a fastener between each of said tensioning lines and each of said anchors, said fastener providing a hook and eye joint.

14. Apparatus according to claim 1 comprising a fastener between each of said tensioning lines and each of said anchors, said fastener providing a hook and eye joint.

15. A method for securing a building having a roof, said roof having a peak, and said roof having a declining pitch from said peak, said method utilizing tensioning lines, ground anchors, fibrous webbing straps, netting material, and peak brackets having a pair of angularly disposed wings, each of said angularly disposed wings having a slotted aperture, said method comprising the steps of:
   planting a plurality of ground anchors around the building peripherally;
   routing a plurality of fibrous webbing straps over said building with netting material spanning said fibrous webbing straps, each of said plurality of fibrous webbing straps having a separate individual peak bracket interposed at an intermediate position thereover, said peak bracket adapted to match said declining pitch of said roof and to rest upon said peak of said roof, said peak bracket utilized to prevent damage to said roof at said peak, each of said plurality of fibrous webbing straps threaded through said slotted aperture of each of said angularly disposed wings of said separate individual peak bracket;
   attaching a tensioning line between each of said plurality of ground anchors and a respective end of each of said plurality of fibrous webbing straps; and
   tensioning each tensioning line so that said plurality of fibrous webbing straps securely restrains said roof in place.

* * * * *